United States Patent [19]

Honda et al.

[11] Patent Number: 5,138,618
[45] Date of Patent: Aug. 11, 1992

[54] IMAGE FORMING APPARATUS WITH COMMUNICATION FUNCTION

[75] Inventors: Yoshitaka Honda; Yukio Nakai, both of Nara, Japan

[73] Assignee: Sharp Kabushiki Kaisha, Osaka, Japan

[21] Appl. No.: 489,090

[22] Filed: Mar. 6, 1990

[30] Foreign Application Priority Data

Mar. 8, 1989 [JP] Japan .................................. 1-57320

[51] Int. Cl.⁵ ............................................ G06F 11/00
[52] U.S. Cl. .................................................. 371/16.4
[58] Field of Search ................... 371/16.4, 29.1, 20.1, 371/15.1; 355/205, 206, 233, 304

[56] References Cited

U.S. PATENT DOCUMENTS

| 4,477,178 | 10/1984 | Furuichi et al. | 371/16.4 |
| 4,499,581 | 2/1985 | Miazga et al. | 371/16.4 |
| 4,639,918 | 1/1987 | Linkowski | 371/16.4 |
| 4,672,574 | 6/1987 | Baird et al. | 371/29.1 |
| 4,707,849 | 11/1987 | Rault et al. | 371/16.4 |

OTHER PUBLICATIONS

"Xerox Unveils Copier That Phones for Help", David Lindley, Mar. 8, 1990, Rochester Democrat Cronicle.
"The Kodak Telassistance Network . . . " pp. 2877-2878, date unknown.
"Xerox 1090 Copier" Electronic Data Interface Operator Guide, pp. 1-10, Version 1.0.

Primary Examiner—Jerry Smith
Assistant Examiner—Phung Chung

[57] ABSTRACT

A system includes an image forming apparatus or copier, and a central controller for remotely determining a cause of malfunction of the copier. The copier includes a control unit including a self-diagnostic portion; a selection portion for setting the control unit to a self-diagnosis mode; and a communication device for, when the self-diagnosis mode is set, connecting the control unit with a communication line. The self-diagnostic portion includes a receiving section for receiving diagnostic information through the communication device; a diagnostic section for executing self-diagnosis against the copier, on the basis of the received diagnostic information; and a transmitting section for transmitting the results of the self-diagnosis through the communication device.

8 Claims, 3 Drawing Sheets

IMAGE FORMING APPARATUS WITH COMMUNICATION FUNCTION

BACKGROUND OF THE INVENTION

1. Field of the Invention

The present invention relates to an image forming apparatus such as a copier which requires relatively frequent maintenance and inspections.

2. Description of the Prior Art

Image forming apparatus such as copiers and laser printers are precision machines which undergo heavy use daily, so they experience relatively more malfunctions and degraded performance than do other apparatus. Thus they require relatively more frequent maintenance and inspections. Generally, such an apparatus is designed so that, when paper becomes jammed in the apparatus during paper transport, the user can easily remove the jam. However, when a major malfunction occurs, for example, the optical unit requires adjustment due to a shifted leading edge in the copy image, etc., or when other unexplained malfunction occurs, the user cannot handle it and a repairman must be called to correct the problem. When being serviced, the repairman will make various adjustments or load special diagnostic programs into the control unit of the apparatus in order to determine the cause of the malfunction. Generally, this mode in which diagnostic information is loaded in the control unit of the apparatus and the cause of the malfunction is determined is referred to as "the diagnosis mode" or "the simulation mode".

However, when such a prior art apparatus requires servicing, the repairman must go to where the apparatus is located and determine the cause of the malfunction by executing simulations. Further, if parts have to be replaced, he must then return to get the parts and go back to the apparatus location, which is a lot of trouble.

SUMMARY OF THE INVENTION

The image forming apparatus of this invention, which overcomes the above-discussed and numerous other disadvantages and deficiencies of the prior art, comprises a control unit including a self-diagnostic means; a selection means for setting said control unit to a self-diagnosis mode; and a communication means for, when said self-diagnosis mode is set, connecting said control unit with a communication line, said self-diagnostic means comprising: a receiving section for receiving diagnostic information through said communication means; a diagnostic section for executing self-diagnosis against said apparatus, on the basis of said received diagnostic information; and a transmitting section for transmitting the results of said self-diagnosis through said communication means.

The self-diagnostic system for an image forming apparatus of this invention, comprises at least one image forming apparatus; a central controller; and a communication line connecting said central controller with each of said image forming apparatus, said image forming apparatus comprising: a local control unit including a self-diagnostic means; a selection means for setting said control unit to a self-diagnosis mode; and a communication means for, when said self-diagnosis mode is set, connecting said control unit with a communication line, said self-diagnostic means comprising: a receiving section for receiving diagnostic information from said central controller through said communication means; a diagnostic section for executing self-diagnosis against said apparatus, on the basis of said received diagnostic information; and a transmitting section for transmitting the results of said self-diagnosis to said central controller through said communication means.

In a preferred embodiment, the central controller comprises: a transmitting means for transmitting said diagnostic information to one of said image forming apparatus through said communication line; a receiving means for receiving said results from said one of said image forming apparatus through said communication line; and a process means for analyzing said transmitted results.

In a preferred embodiment, the communication line is a telephone line.

Thus, the invention described herein makes possible the objectives of:

(1) providing an image forming apparatus from which the cause of the malfunction can be remotely obtained;

(2) providing an image forming apparatus which can be subjected to a diagnosis on the basis of information transmitted from a remote place;

(3) providing a self-diagnostic system for an image forming apparatus in which the cause of the malfunction of the image forming apparatus can be obtained from a place remote from the place where the image forming apparatus is installed; and (4) providing a self-diagnostic system for an image forming apparatus in which the image forming apparatus can be subjected to a diagnosis on the basis of information transmitted from a place remote from the place where the image forming apparatus is installed.

These and further objects of the present invention will become more readily apparent from the understanding of the preferred embodiments, with reference to the drawing figures.

BRIEF DESCRIPTION OF THE DRAWINGS

This invention may be better understood and its numerous objects and advantages will become apparent to those skilled in the art by reference to the accompanying drawings as follows, wherein like reference numerals represent like parts.

DESCRIPTION OF THE PREFERRED EMBODIMENTS

Figure 1:
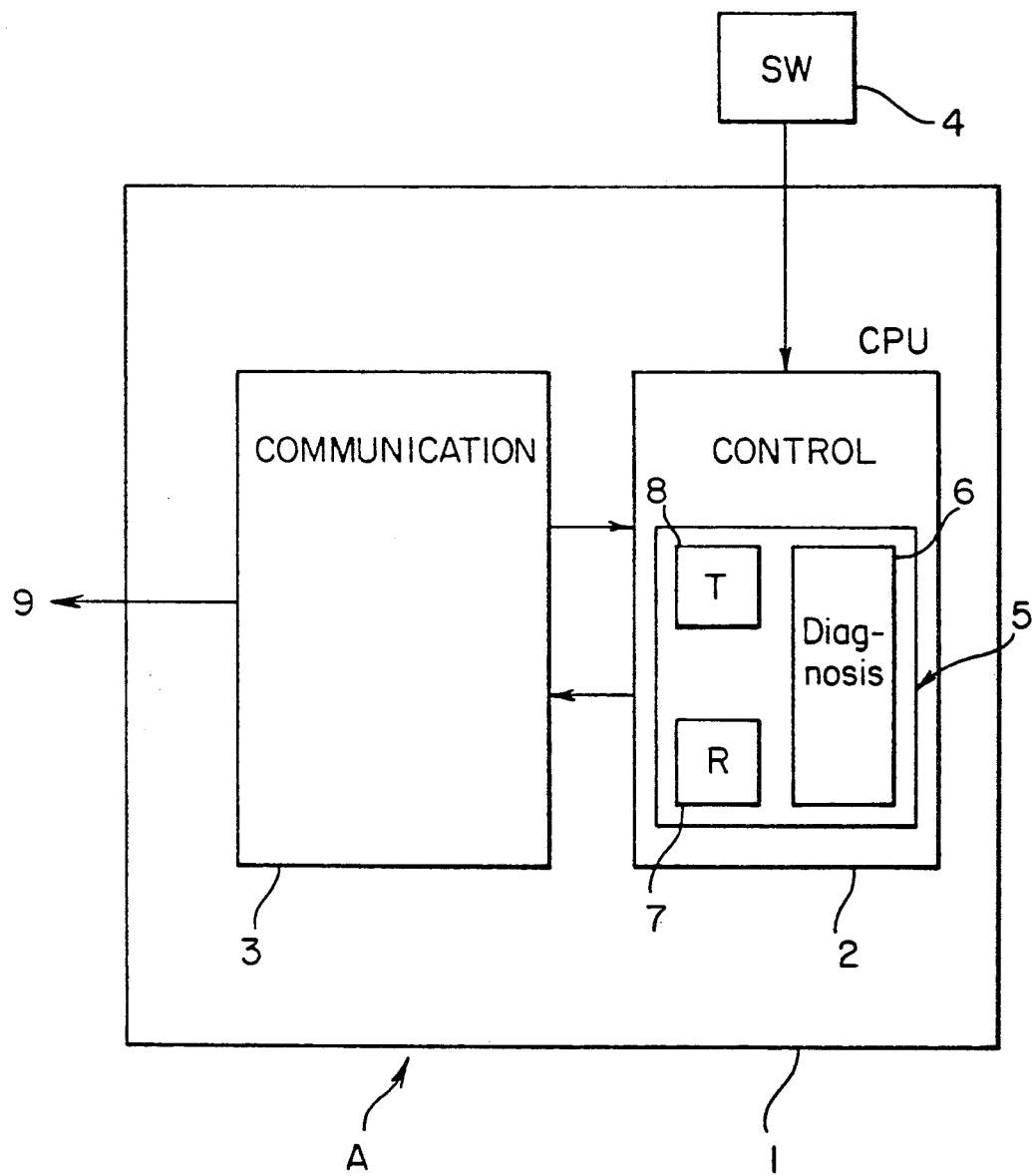
FIG. 1 is a block diagram of an image forming apparatus according to the invention.

FIG. 1 shows diagrammatically an image forming apparatus according to the present invention. The image forming apparatus A shown in FIG. 1 is a copier which comprises a main body 1. In the main body 1, disposed are a control unit 2 which drives and controls a photosensitive drum and an optical system (which are not shown) and controls the paper transport; a communication unit 3 which connects the control unit 2 with a telephone line 9; and a self-diagnostic means 5 for executing the diagnostic mode. The self-diagnostic means 5 is actually realized, in one preferred embodiment, through a program and is executed through a CPU in the control unit 2. The self-diagnostic means 5 comprises a receiving section 7 for receiving diagnostic information over the telephone line 9 via the communication unit 3; a diagnostic section 6 for executing diagnosis based on the diagnostic information, and a transmitting section 8 for sending diagnostic results via the communication unit 3. The control unit 2 previously incorporates a program in it for executing the diagnosis or simulation. When a switch 4 disposed on the main body 1 is turned ON, the control unit 2 is set to the diagnostic mode, and the communication unit 3 is activated.

When the copier A malfunctions and requires the attention of a repairman, the user telephones the repairman at a service center and reports to him that the copier A requires service. The user and repairman exchange instructions over the telephone line 9. The repairman then instructs the user to turn ON the switch 4. While still holding on to the line, the user then turns the switch 4 ON so as to cause the communication unit 3 to operate and to set the control unit 2 to the diagnostic mode. When the switch 4 has been turned ON and the diagnostic mode has been set, the self-diagnostic means 5 begins operation and waits for diagnostic instructions from the telephone line 9 via the communication unit 3. When the repairman sends the diagnostic information over the telephone line 9, it is received by the receiving section 7. Then, based on this received information, the diagnostic section 6 performs a diagnosis and produces diagnostic results. The transmitting section 8 then sends the diagnostic results to the repairman over the telephone line 9 via the communication unit 3. The repairman determines if any circuit boards or parts need replacement based on the diagnostic results, and then prepares the necessary parts and takes them to the user.

Figure 2:
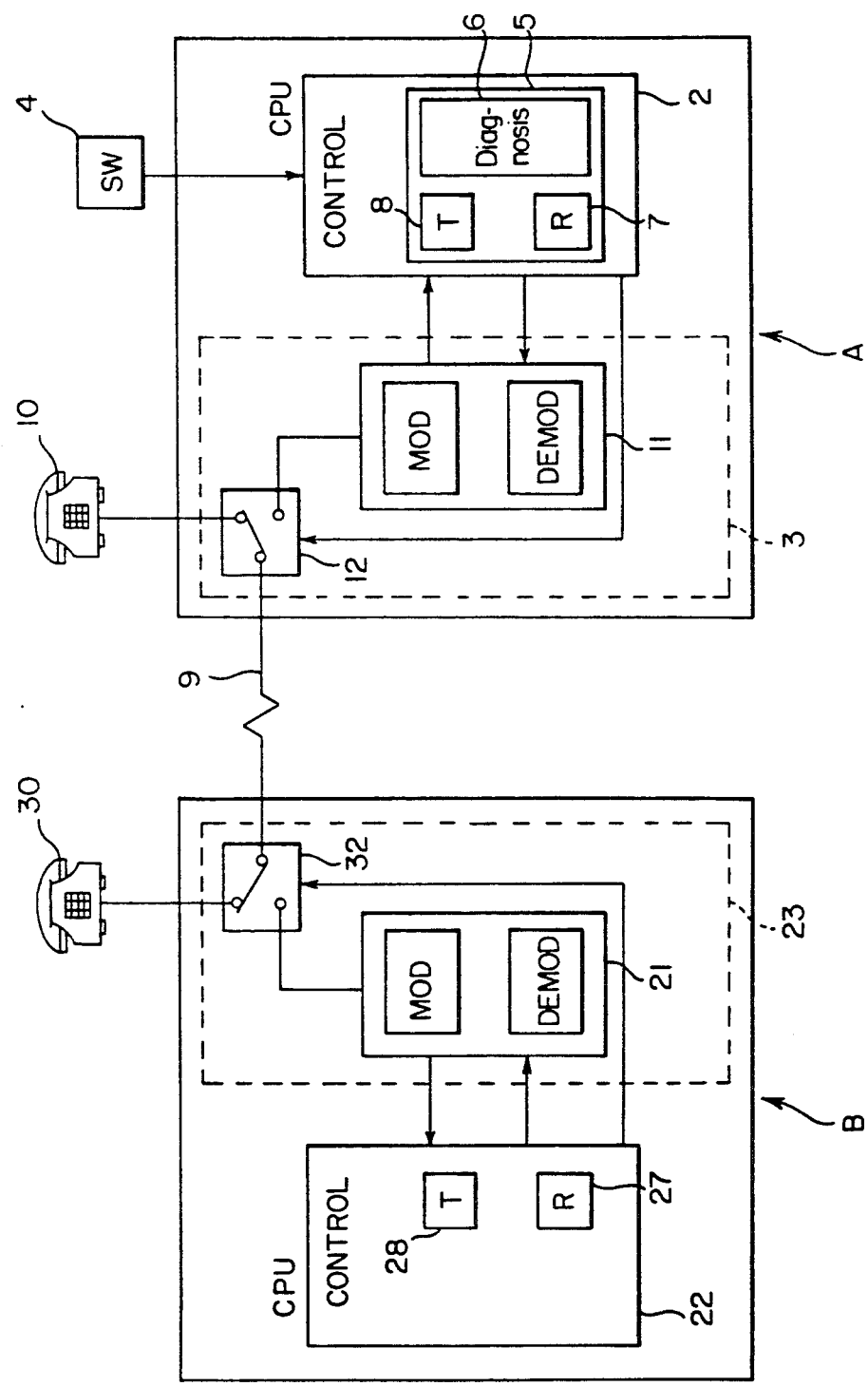
FIG. 2 is a block diagram of a self-diagnostic system according to the invention.

FIG. 2 shows the relationship between the copier A and a central controller B. In FIG. 2, the configuration of the copier A is illustrated in a more specific manner. The copier A is further provided with a telephone 10, and the communication unit 3 comprises a modulator-demodulator (modem) 11 and a duplexer 12. The duplexer 12 is a switch which directs a signal from the telephone line 9 to the demodulator of the modem 11 or to the telephone 10; and a signal from the modulator of the modem 11 or from the telephone 10 to the telephone line 9. The central controller B is located at a service center where the repairman is on standby, and comprises a control unit 22, a communication unit 23 which connects the control unit 22 with the telephone line 9, and a telephone 30. The control unit 22 has a receiving section 27 for receiving diagnostic results from any one of various copiers including the copier A, and a transmitting section 28 for sending diagnostic information to the copier. In the same manner as the copier A, the receiving and transmitting sections 27 and 28 are actually realized through a program and are executed through a CPU in the control unit 22. The communication unit 23 includes a modem 21 and a duplexer 32.

Figure 3:
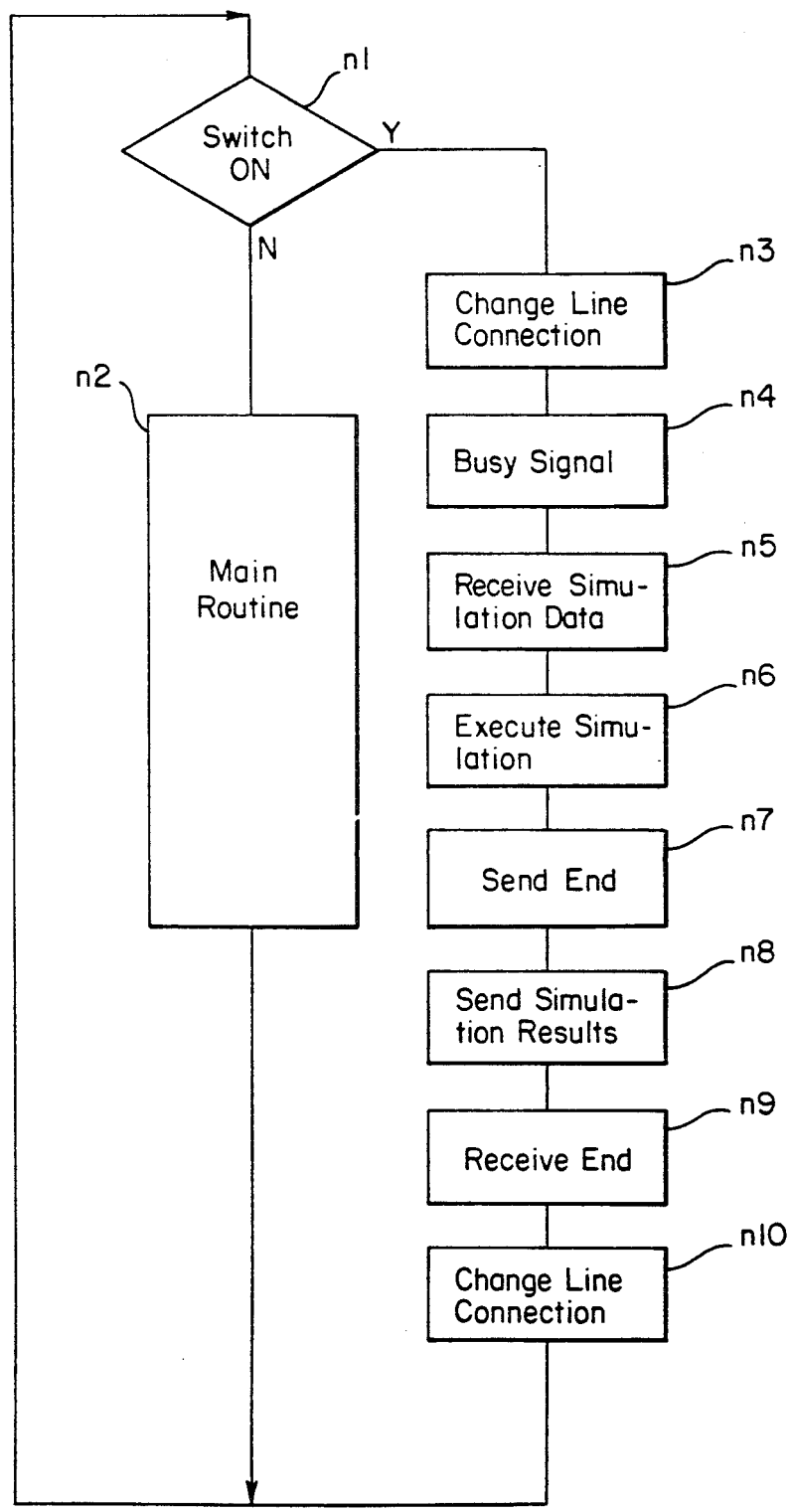
FIG. 3 is a flowchart of the diagnosis mode in the image forming apparatus used in the embodiment of FIG. 2.

With reference to FIG. 3, the operation of the copier A in the diagnosis mode will be described. Hereinafter, the diagnostic information transmitted from the central controller B is referred to as "simulation data". In a usual state, the switch 4 of the copier A is not operated. The control unit 2 of the copier A continues to perform the main routine (step n2) as long as the switch 4 is off. This main routine controls the normal copier operation.

When a malfunction occurs in the copier A and it requires the attention of a repairman, the user contacts a repairman at the service center. The repairman then sets the central controller B so that it can send the simulation data to the copier A. While holding the line, the user then turns the switch 4 ON (step n1) to set the control unit 2 to the simulation mode. When the control unit 2 enters the simulation mode, it operates the duplexer 12 so that the telephone line 9 is connected to the modem 11 (step n3), thereby enabling the transferring of data between the control unit 2 and the controller B.

When the copier A becomes capable of receiving simulation data from the controller B, it first sends a busy signal to the controller B (step n4). Reception of this busy signal causes the controller B to send simulation data generated by the control unit 22 to the copier A (step n5). Reception of this simulation data by the copier A causes the control unit 2 to execute the simulation. The control unit 2 in which a program for executing the simulation has been previously incorporated executes the simulation based on the simulation data it receives (step n5). When the simulation is completed, the simulation or diagnostic results are loaded in a transmission buffer (not shown) in the control unit 2 and an END signal is sent to the controller B (step n7), after which the simulation results edited in the transmission buffer are sent to the controller B through the modem 11, the duplexer 12 and the telephone line 9 (step n8). When the simulation results are received at the controller B, an END signal is sent to the copier A (step n9). Reception of the END signal at the copier A causes the duplexer 12 to connect the telephone line 9 to the telephone 10 (step n10), and the simulation mode in the copier A is completed.

When the simulation results from the copier A are received at the controller B, the repairman determines the cause of the malfunction based on the simulation results, and if it is necessary to replace a circuit board or other part, he prepares such and goes to the user.

By performing the above operation, the repairman can avoid having to go to the user two times, thus avoiding time and travel expenses.

According to the invention, when a user needs a repairman to repair an image forming apparatus, a communication means is used to receive external diagnostic information (i.e., the simulation data in the above-described embodiment), a diagnosis is executed based on the received diagnostic information, and the diagnostic results are sent back over the telephone line, so diagnosis of the image forming apparatus can be performed remotely. Therefore, if a malfunction occurs in an image forming apparatus which requires the replacement of a circuit board or other part, the need for such replacement can be confirmed Thus, the replacement circuit board or part can be prepared and taken to the malfunctioning image forming apparatus and repair completed in one trip.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An image forming device comprising:
   a control unit including a self-diagnostic means;

selection means, operatively connected to the control unit, for selecting a self diagnosis mode for said control unit; and (a) communication means, operatively connected to the control unit, for when said self-diagnosis is selected, connecting said control unit with a communication line, said self-diagnosis means including, receiving means for receiving diagnostic information through said communication means;

diagnostic means, operatively connected to the receiving means, for executing self-diagnosis against said image forming device, based upon said received diagnostic information; and transmitting means, operatively connected to the diagnostic means, for transmitting results of said executed self-diagnosis through said communication means.

2. A self-diagnostic system for an image forming device comprising:

at least one image forming device;

a central controller; and a communication line connecting said central controller with each said at least one image forming device, each said at least one image forming device including, a local control unit including a self-diagnostic means;

selection means, operatively connected to the control unit, for selecting self-diagnosis mode for said control unit; and communication means, operatively connected to the control unit, for, when said self-diagnosis mode is selected, connecting said control unit with a communication line, said self-diagnostic means further including, receiving means for receiving diagnostic information from said central controller through said communication means;

diagnostic means, operatively connected to the receiving means, for executing self-diagnosis against said image forming device, based upon said received diagnostic information; and transmitting means, operatively connected to the diagnostic means, for transmitting results of said executed self-diagnosis to said central controller through said communication means.

3. A self-diagnostic system according to claim 2 wherein said central controller comprises:

transmitting means for transmitting said diagnostic information to one of said at least one image forming device through said communication line;

receiving means for receiving said results from said at least one image forming device through said communication line; and process means, operatively connected to the transmitting means, for analyzing said transmitted results.

4. A self-diagnostic system according to claim 2 wherein said communication line is a telephone line.

5. A self-diagnostic method for diagnosing problems in an electronic device from a central controller at a remote location, the method comprising the steps of:

a) setting a control unit, of the electronic device, to a self-diagnosis mode;

b) connecting the control unit to a communication line, connected to the central controller, upon the control unit being set to the self-diagnosis mode;

c) transmitting a signal from the control unit to the central controller upon obtaining the connection;

d) transmitting diagnostic information from the central controller to the control unit, via the communication line, upon receiving the transmitted signal of step c;

e) executing self-diagnosis on the electronic device, based upon the transmitted diagnostic information received at the control unit;

f) transmitting results of the self-diagnosis to the central controller via the communication line;

g) transmitting a disconnected signal to the control unit, via the communication line, upon receiving the self-diagnosis results, and h) disconnecting the control unit from the communication line.

6. The method of claim 5, wherein the signal of step (c) is a busy signal.

7. The method of claim 5, wherein the electronic device is an image forming device.

8. The image forming device of claim 1, wherein the communication means is a switch for connecting the control u nit to the communication line.

* * * * *